United States Patent [19]
Fredrick

[11] Patent Number: 5,868,890
[45] Date of Patent: Feb. 9, 1999

[54] PROCESS FOR BONDING A COVER TO A SUBSTRATE

[75] Inventor: John Fredrick, Davisburg, Mich.

[73] Assignee: Eften, Inc., Auburn Hills, Mich.

[21] Appl. No.: 755,283

[22] Filed: Nov. 22, 1996

[51] Int. Cl.⁶ .............................. B32B 33/00; B29C 65/48
[52] U.S. Cl. .......................... 156/214; 156/282; 156/222
[58] Field of Search .................................... 156/214, 282, 156/222

[56] References Cited

U.S. PATENT DOCUMENTS

| | | | |
|---|---|---|---|
| 4,132,581 | 1/1979 | Swartz | 156/208 |
| 4,983,247 | 1/1991 | Kim | 156/272.2 |
| 5,134,014 | 7/1992 | Zaima et al. | 428/186 |

FOREIGN PATENT DOCUMENTS

| | | |
|---|---|---|
| 660182 | 8/1965 | Belgium . |
| 0569846 | 11/1993 | European Pat. Off. . |
| 2360420 | 3/1978 | France . |
| 2582255 | 11/1986 | France . |
| 2229673 | 10/1990 | United Kingdom . |
| 2252073 | 7/1992 | United Kingdom . |
| 8801935 | 3/1988 | WIPO . |

OTHER PUBLICATIONS

EPO Search Report in 97309356—Mar. 31, 1998.

*Primary Examiner*—Francis J. Lorin
*Attorney, Agent, or Firm*—Notaro & Michalos P.C.

[57] ABSTRACT

A process for making a composite substrate with cover utilizes heated dies of a forming tool to deform and heat the substrate. The heated substrate is then placed in a marriage tool having a room temperature lower die for receiving the substrate, and a heated upper die. A cover material layer is placed over the substrate and the marriage tool is closed. The cover material includes a heat activatable adhesive and with the marriage tool closed, the heat from the upper die adheres the cover material layer to the substrate while the room temperature die cools the substrate. In this way, when the marriage tool is opened, the composite structure can be removed without deformation.

8 Claims, 4 Drawing Sheets

FIG. 1
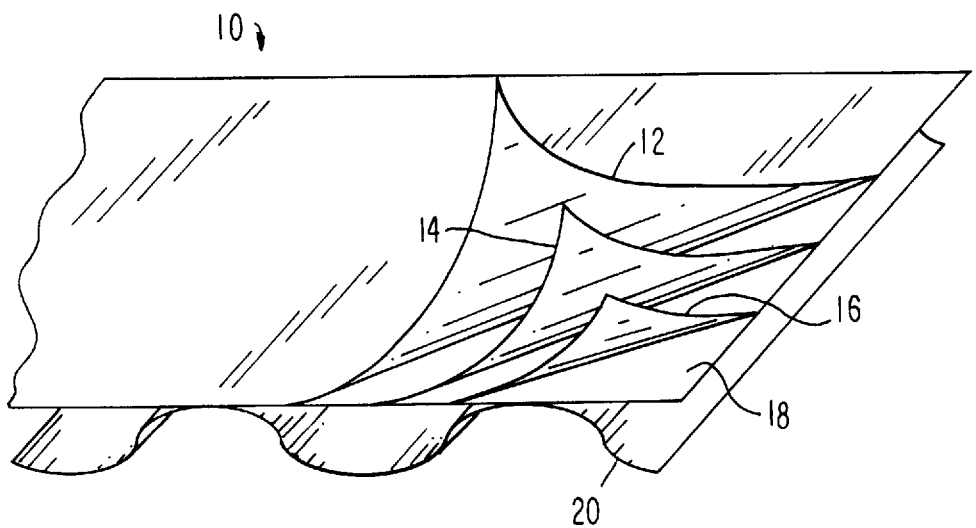
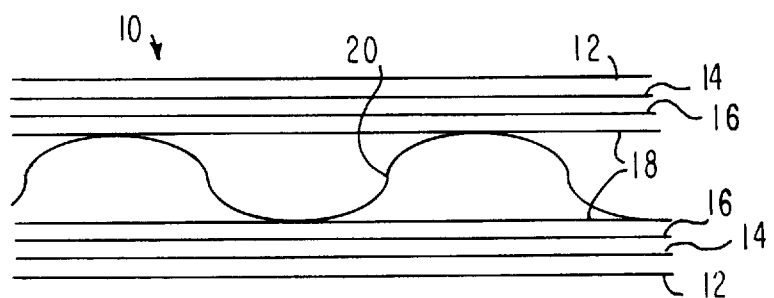
FIG. 2

PROCESS FOR BONDING A COVER TO A SUBSTRATE

FIELD AND BACKGROUND OF THE INVENTION

The present invention relates, in general, to composite substrate such as headliners of motor vehicles, and in particular, to a new and useful process for bonding a cover and the substrate together.

U.S. Pat. Nos. 5,022,943 and 5,134,014, which are both incorporated here by reference, disclose methods, structures and materials for composite substrates of the type to which the present application relates.

FIG. 1 illustrates a corrugated fiberboard and thermoplastic composite substrate of the type which can be covered according to the process of the present invention.

The substrate generally designated 10 includes an upper kraft paper layer 12, and intermediate thermoplastic film layer 14 (e.g. PE), an inner kraft liner 16, an inner thermoplastic layer 18, and a corrugated fiberboard medium 20, with a similar construction opposite the corrugated medium.

FIG. 1 illustrates a single facer product while FIG. 2, where the same reference numerals are utilized to designate the same or similar elements, illustrates a single wall product. The combination of different paperweights with thermoplastic gives the substrate unique properties. When heat is applied, the films melt, releasing the liners and allowing the corrugated medium to slip into shape by using molding dies. After removing the heat, the thermoplastic films weld the materials together, rigidly in their new shape and configuration. The substrate is extremely versatile in its uses and the product can be laminated with different liner weights, PET, aluminum, non-woven or other materials bonded to the substrate for various applications. A vehicle headliner having various qualities of rigidity, noise absorption and other advantages is one example of a use for the substrate.

Two processes are currently known for manufacturing this type of composite substrate. FIG. 3 illustrates one of these processes in which one compression molding tool is used to both form and cover the substrate.

In an initial step 30, the substrate 10 is placed between an upper heated die 22 and a lower heated die 24, both heated to approximately 130° C. In a subsequent pressure step 32, the dies are moved toward each other to heat and compress the substrate 10 for about 25–30 seconds.

In a subsequent step 34, the tool is opened by separating the dies 22, 24 from each other and a layer of cover material 40 is placed over the now formed substrate 10, between the dies.

Cover 40 may be any desired layer which is meant to be attached to either surface of the substrate 10, for an example, a decorative layer, with or without additional layers such as foam backings and the like. Examples of the types of cover layers which can be used are illustrated in U.S. Pat. No. 5,134,014. It is necessary that the cover layer 40 have a layer of heat activated adhesive or an adhesive quality or be capable of adhering under heating, to the substrate 10.

In subsequent step 36, the tool is closed by moving the dies 22, 24 toward each other to heat and apply pressure to the substrate 10 with cover 40, for an additional dwell time of approximately 25–30 seconds. Steps 32 and 36 represent first and second strokes for the tool. The second stroke 36 melts the adhesive on the cover material 40, bonding it to the substrate 10. The tool is then opened in step 38 and the molded substrate 10, 40, in the form of a vehicle headliner in the illustration of FIG. 3, is removed.

In a further step 42, the headliner 10, 40 is placed on a cooling nest 26. The cooled part may then be placed in a rack for later trimming or can be trimmed immediately in a subsequent trimming step. The process is then repeated for manufacturing additional products.

The advantages of this process are low cost since only one hydraulic press is required to open and close the tool. Good bonding is also achieved between the cover 40 and the substrate 10 because of the use of both upper and lower heated dies in the tool. In this field, the closing stroke 36 is referred to as a "heated marriage" step.

Disadvantages of the process illustrated in FIG. 3 include slow cycle time since two strokes are required in the same tool.

Since the substrate and perhaps even the cover have thermoplastic components, there is also the danger of deforming the product when it is removed from the heated tool. Care must be exercised, thus, in removing the product and this also involves additional time penalties.

Referring to FIG. 4, another known process for manufacturing the covered substrate, was developed to reduce cycle time and to yield a cool, easily handled part after the heated marriage of the cover material. In an initial step 50, substrate 10 is placed between heated dies of a first heated forming tool, heated to approximately 200°–220° C. In a second step 52 of the process, the tool is closed in a first stroke for approximately 25–30 seconds. In step 54 the tool is opened and the hot formed substrate 10 is placed between the cold dies 62 and 64 of a cold marriage tool. Cover material 40 is placed over the heated substrate 10 and the cold tool is closed in step 56.

The residual heat in the substrate 10 melts the adhesive of the cover material 40, thus bonding the cover to the substrate. While the marriage tool is cycling for approximately 25–30 seconds in its closed condition, another substrate can be molded in the hot forming tool 22, 24 thus increasing throughput, output or productivity.

In step 58, the cold marriage tool is opened and the cooled headliner 10, 40 can be removed for trimming or storage on a rack.

The advantage of the process of FIG. 4 is reduced cycle time. While the first substrate is in the cold marriage tool, another substrate can be running through the forming cycle. The thermoplastic is set, coming out of the cold marriage tool, allowing for immediate handling without the risk of deforming the product.

Disadvantages are that further reductions in cycle time are limited due to temperature requirements of the substrate when it is placed in the cold marriage tool. Occasional cover material de-lamination has also occurred when the substrate is too cool when it enters the cold marriage tool. Also, at forming temperatures over 220° C. a noticable increase in odor occurs.

A need remains for further improvements in the manufacturing techniques of this type of covered composite substrate.

SUMMARY OF THE INVENTION

The present invention comprises a process which has the advantages of reduced cycle time over the process of FIGS. 3 and 4. Dwell times of 10–20 seconds can be achieved according to the present invention as opposed to 25–30 seconds for the process of FIG. 4.

An aggressive cover material bond can also be achieved with the present invention, greater than the bond achieved in the process of FIG. 3 or FIG. 4. According to the present invention, the thermoplastic is set coming out of the cold marriage tool, allowing for handling of the product without the risk of deformation as in the process of FIG. 4.

Accordingly, an object of the present invention is to provide a method for manufacturing a substrate with a cover, and in particular, a process for bonding a cover to a substrate, which has the advantages of quick cycle time and aggressive bonding between the substrate and cover, without the disadvantages of deformation during handling and other known disadvantages.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a partial, schematic perspective view of a composite substrate which can be covered using the process of the present invention;

FIG. 2 is a partial transverse sectional view of another substrate that can be manufactured or covered by the present invention;

DESCRIPTION OF THE PREFERRED EMBODIMENT

Figure 5:
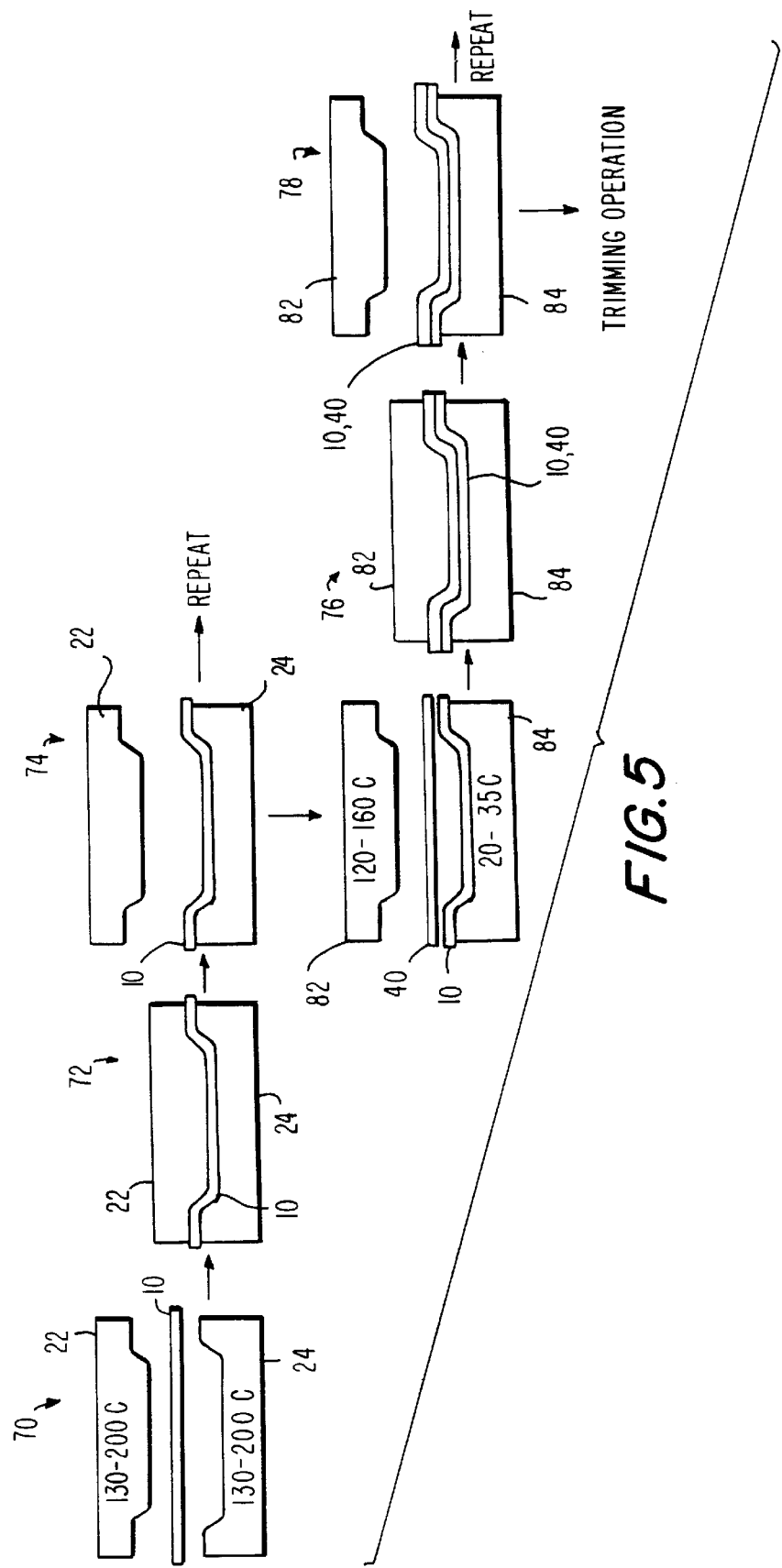
FIG. 5 is a view similar to FIG. 4, illustrating the process of the present invention.

Referring to the drawings in particular, the invention embodied in FIG. 5 comprises a process for making a composite substrate in general, and a headliner specifically, which has significant advantages over known processes.

Referring to FIG. 5, the process of the present invention comprises an initial step 70 in which upper and lower dies 22,24 of a heated pressure tool are heated to approximately 130–200° C. Substrate 10 is placed between the dies and the hot pressure tool is closed in step 72, with the substrate being heated and deformed under pressure for a period of about 10–20 seconds. The forming tool should be heated to a minimum of about 130° C. but no more than 200° C. to avoid overheating.

After the first stroke, or forming cycle 72, the heated tool is opened in step 74 and the substrate 10 which is from warm to hot, is placed in a special marriage tool 82, 84, having an upper heated die 82, heated to about 120 to about 150° C. and a lower die 84 which is chilled to about 20°–35° C. Cover material 40 is placed over the substrate 10 and the now hot/cold marriage tool is closed in step 76 with pressure being applied to the substrate with cover 10,40 for an additional dwell time of about 10–20 seconds. The upper hot die 82 in the hot/cold marriage tool, functions to melt the adhesive of the cover material 40 to form an aggressive bond with the substrate 10, which is also hot.

The lower half of the marriage tool 84, chilled to 20°–35° C., helps advance cooling in the direction toward the cool tool 84, helping the thermoplastic of the substrate to harden for immediate handling when the hot/cold marriage tool is opened in step 78.

The now formed, solid and adhered product 10,40 can be sent to a trimming step or to a rack for storage without fear of deformation.

Figure 3:
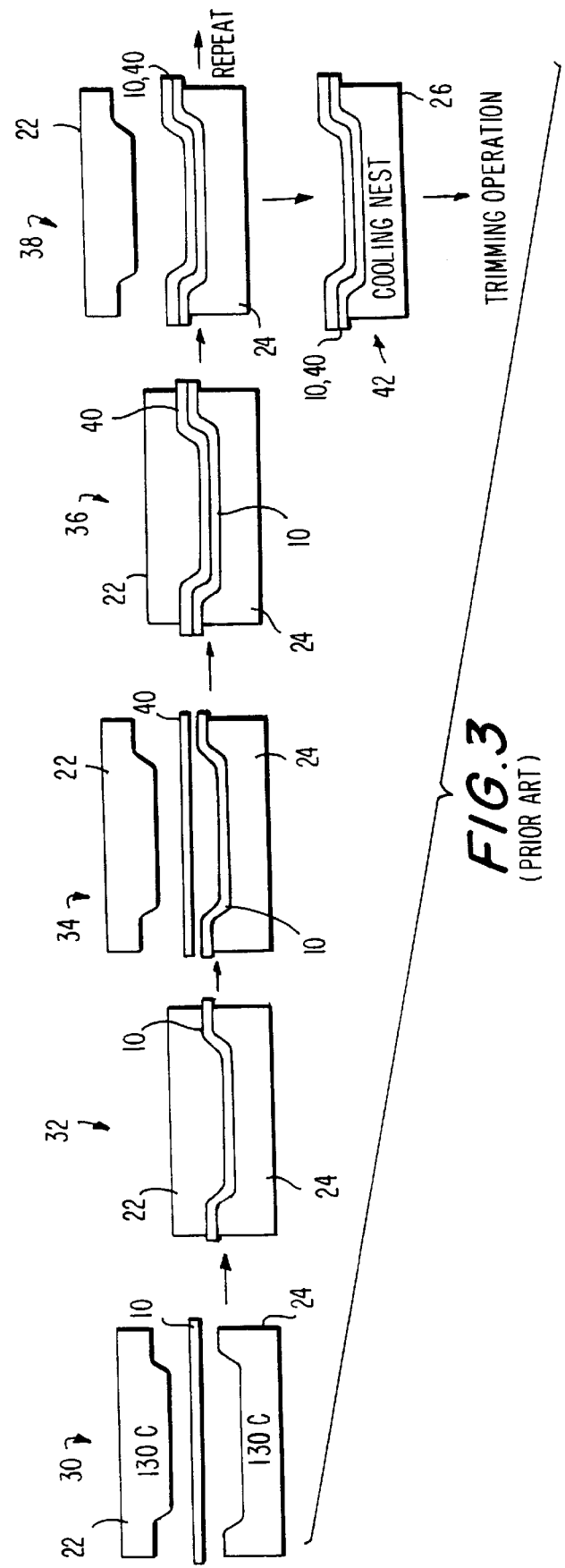
FIG. 3 is a graphic flow chart illustrating a known process for making a composite substrate.
Figure 4:
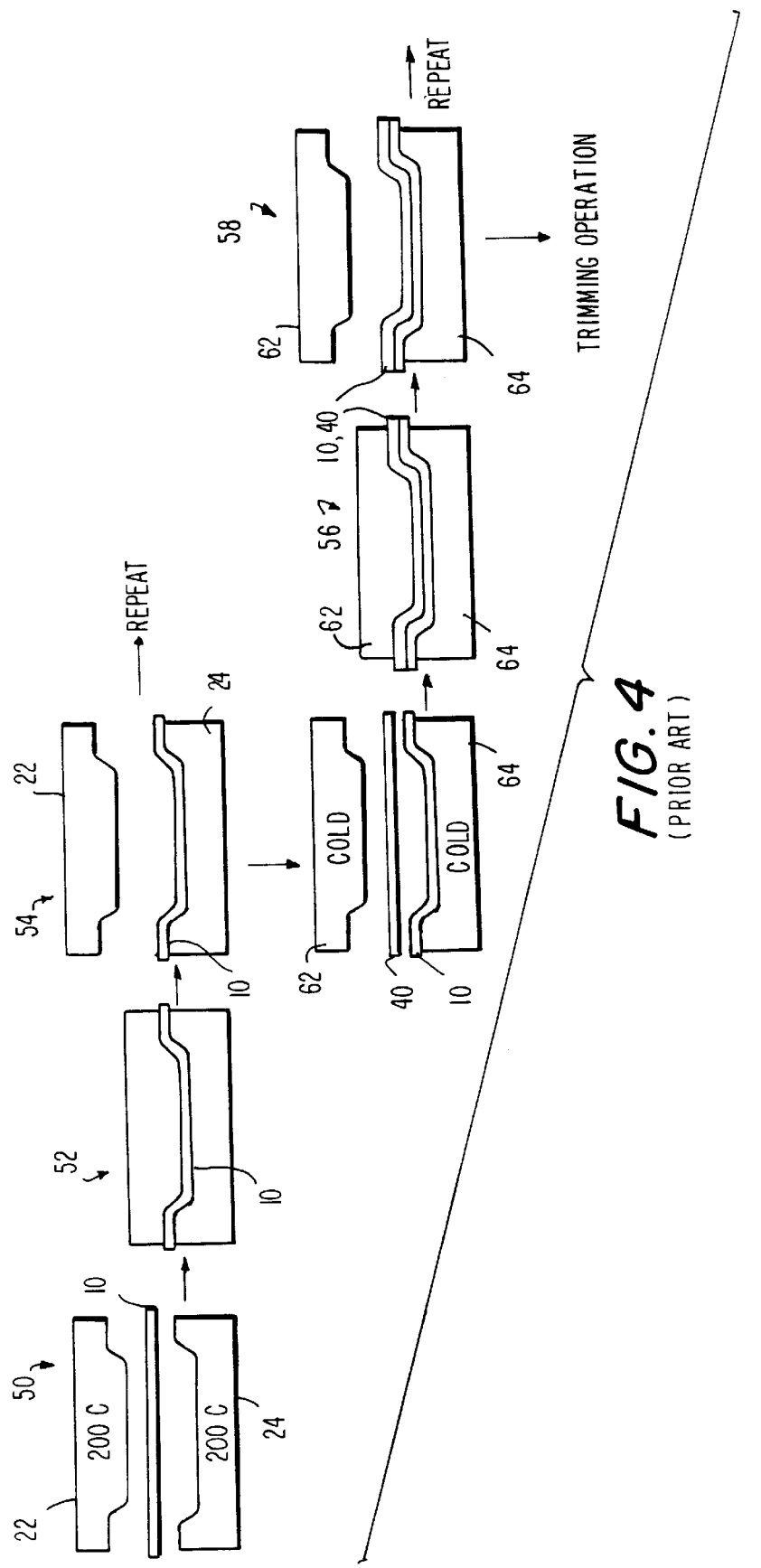
FIG. 4 is a view similar to FIG. 3 of the another known process.

The dwell times of the process of FIG. 4 are reduced from about 25–30 seconds to about 10–20 seconds per stroke in the process of the present invention, without any additional tooling, and without the disadvantages of the process of FIG. 3 or FIG. 4 including slow cycle time and danger of deforming the product.

While a specific embodiment of the invention has been shown and described in detail to illustrate the application of the principles of the invention, it will be understood that the invention may be embodied otherwise without departing from such principles.

What is claimed is:

1. A process for making a composite substrate with cover, comprising:

placing a composite substrate containing at least one heat deformable layer, between a first pair of heated dies which we heated to about 130°–200° C., the substrate comprising at least one layer of corrugated fiberboard medium and at least one layer of thermoplastic film;

closing the heated dies for a first dwell time, for heating and applying pressure to the substrate for deforming the substrate;

opening the heated dies and removing the hot deformed substrate;

inserting the hot deformed substrate between an upper heated die and a lower cold die in a marriage tool which is different from the first heated dies, the upper heated die of the marriage tool being at about 120°–510° C. and the lower cold die being chilled;

placing a cover material layer in the marriage tool over the substrate and adjacent the upper heated die of the marriage tool, the cover material including adhesive facing the substrate and activatable by heat for bonding the cover material layer to the substrate;

closing the marriage tool for a second dwell time, and applying pressure to the cover material layer and substrate, the upper heated die of the marriage tool helping to adhere the cover material layer to the substrate with the cold die of the marriage tool helping to cool and set the substrate; and opening the marriage tool and removing the substrate with cover material layer.

2. A process according to claim 1 wherein the first dwell time is approximately 10–20 seconds.

3. A process according to claim 2 wherein the marriage tool is closed for a second dwell time, the second dwell time being approximately 10–20 seconds.

4. A process according to claim 1 wherein the cold die of the marriage tool is chilled to about 20°–35° C.

5. A process according to claim 1 wherein the adhesive of the cover material layer comprises a thermoplastic film facing the substrate when the cover material layer is inserted into the marriage tool.

6. A process according to claim 1 wherein the substrate includes at least one layer of kraft paper.

7. A process for making a substrate-plus-cover combination, the substrate including at least one layer of corrugated fiberboard medium and at least one layer of thermoplastic film, the process comprising:

heating upper and lower dies of a first heated tool to about 130°–200° C.;

inserting the substrate having at least one layer of corrugated fiberboard medium and at least one layer of thermoplastic, between the dies of the first heated tool;

closing the first heated tool to apply pressure and heat to the substrate to deform and heat the substrate for a first dwell time;

opening the first heated tool and removing the hot substrate;

inserting the hot substrate into a second marriage tool having a hot die and a cold die, the-hot die being heated to about 120°–150° C. and the cold die being at about room temperature, the substrate being placed adjacent the cold die;

inserting a cover material layer having a heat activatable adhesive facing the substrate, into the second marriage tool, the cover material layer being adjacent the heated die;

closing the second marriage tool to pressurize and adhere the cover material layer to the substrate for a second dwell time of about 10–20 seconds; and opening the second marriage tool and removing the composite substrate with cover from the second marriage tool.

8. A method according to claim 7 including trimming the composite substrate with cover after it is removed from the marriage tool.

* * * * *